United States Patent
Wu

(10) Patent No.: US 6,945,915 B2
(45) Date of Patent: Sep. 20, 2005

(54) TRANSMITTING DEVICE FOR EXERCISE APPLIANCES

(75) Inventor: Mu-Chuan Wu, Tainan Hsien (TW)

(73) Assignee: Tonic Fitness Technology, Inc., Tainan Hsien (TW)

( * ) Notice: Subject to any disclaimer, the term of this patent is extended or adjusted under 35 U.S.C. 154(b) by 111 days.

(21) Appl. No.: 10/413,155

(22) Filed: Apr. 15, 2003

(65) Prior Publication Data

US 2004/0209742 A1 Oct. 21, 2004

(51) Int. Cl.[7] .............................................. A63B 22/06
(52) U.S. Cl. ......................................... 482/57; 482/64
(58) Field of Search .......................... 482/51–53, 57–65

(56) References Cited

U.S. PATENT DOCUMENTS

| | | | | |
|---|---|---|---|---|
| 4,824,102 A | * | 4/1989 | Lo ............................... | 482/59 |
| 4,838,544 A | * | 6/1989 | Sasakawa et al. ............ | 482/62 |
| 4,895,362 A | * | 1/1990 | Ross ............................. | 482/62 |
| 4,902,001 A | * | 2/1990 | Balbo ........................... | 482/62 |
| 4,962,925 A | * | 10/1990 | Chang ........................... | 482/62 |
| 6,475,122 B2 | * | 11/2002 | Wu ............................... | 482/57 |

* cited by examiner

Primary Examiner—Stephen R. Crow
(74) Attorney, Agent, or Firm—Bacon & Thomas, PLLC

(57) ABSTRACT

A transmitting device for exercise appliances includes a first, a second and a third shaft all fixed on a bike frame in parallel. The first shaft has a first transmitting wheel and a first transmitting wheel, the second shaft has a second transmitting gear with a one-way bearing and a second transmitting gear, and the third shaft has a third transmitting wheel with a one-way bearing, a fourth transmitting wheel and a fifth transmitting wheel. The first transmitting gear engages with the second transmitting gear, the first transmitting wheel is connected with the third transmitting wheel by a first connecting member, the second transmitting wheel is connected with the fifth transmitting wheel by an endless belt. The fourth transmitting wheel always rotates in an ordinary or forward direction, whether the first shaft is rotated in the ordinary or in the reverse direction.

3 Claims, 3 Drawing Sheets

TRANSMITTING DEVICE FOR EXERCISE APPLIANCES

BACKGROUND OF THE INVENTION

1. Field of the Invention

This invention relates to a transmitting device for exercise appliances, particularly to one provided with a drive handle for a user to grab with a hand or hands or to tread with feet for exercise, with a subordinate wheel such as a flywheel or a fan fixed with the exercise appliance always rotating in the same direction, whether the user rotates the drive handle in an ordinary (clockwise) or a reverse (counterclockwise) direction.

2. Description of the Prior Art

A conventional transmitting device for an exercise appliance is disclosed in a U.S. Pat. No. 6,475,122 B2 which the same applicant of this invention acquired.

SUMMARY OF THE INVENTION

This invention has been devised to offer a transmitting device for exercise appliances, which has a subordinate wheel such as a flywheel or fan fixed with the exercise appliance to rotate in the same direction, whether the user rotates a drive handle in the forward/ordinary (clockwise) or the reverse (counterclockwise) direction.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
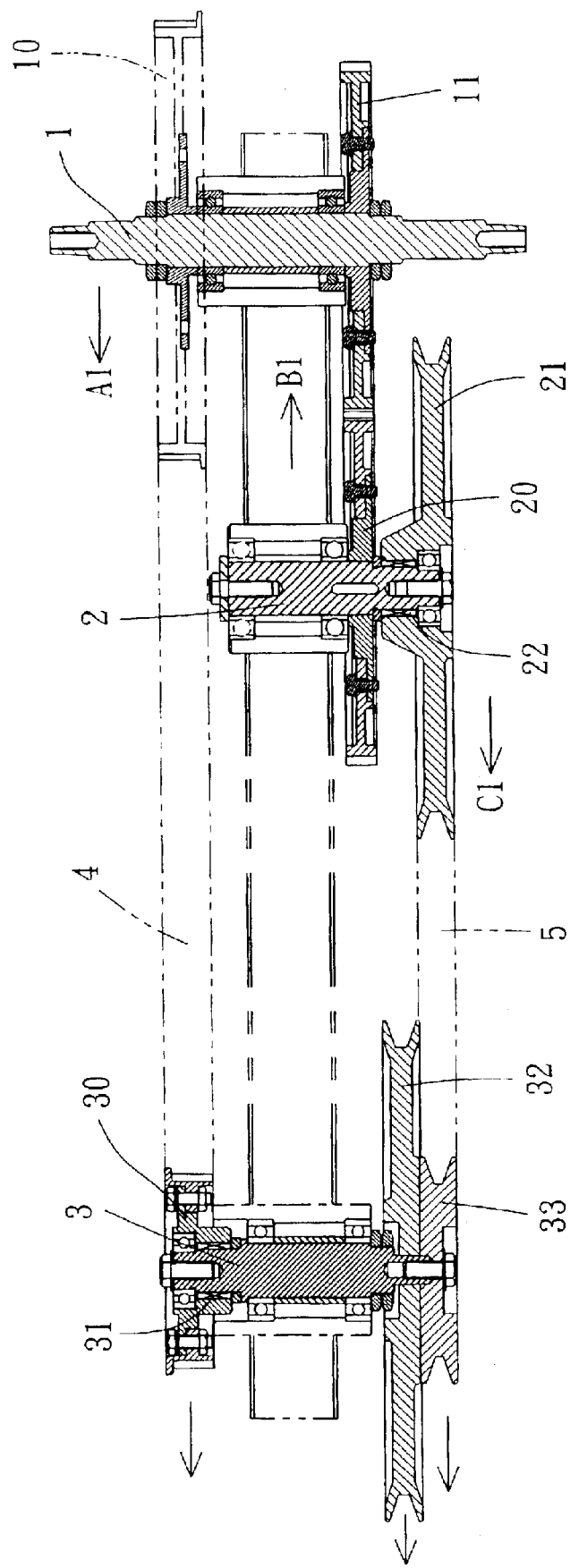
FIG. 1 is an upper cross-sectional view of a transmitting device for exercise appliances with the first shaft rotating in the forward or ordinary (clockwise) direction in the present invention.
Figure 2:
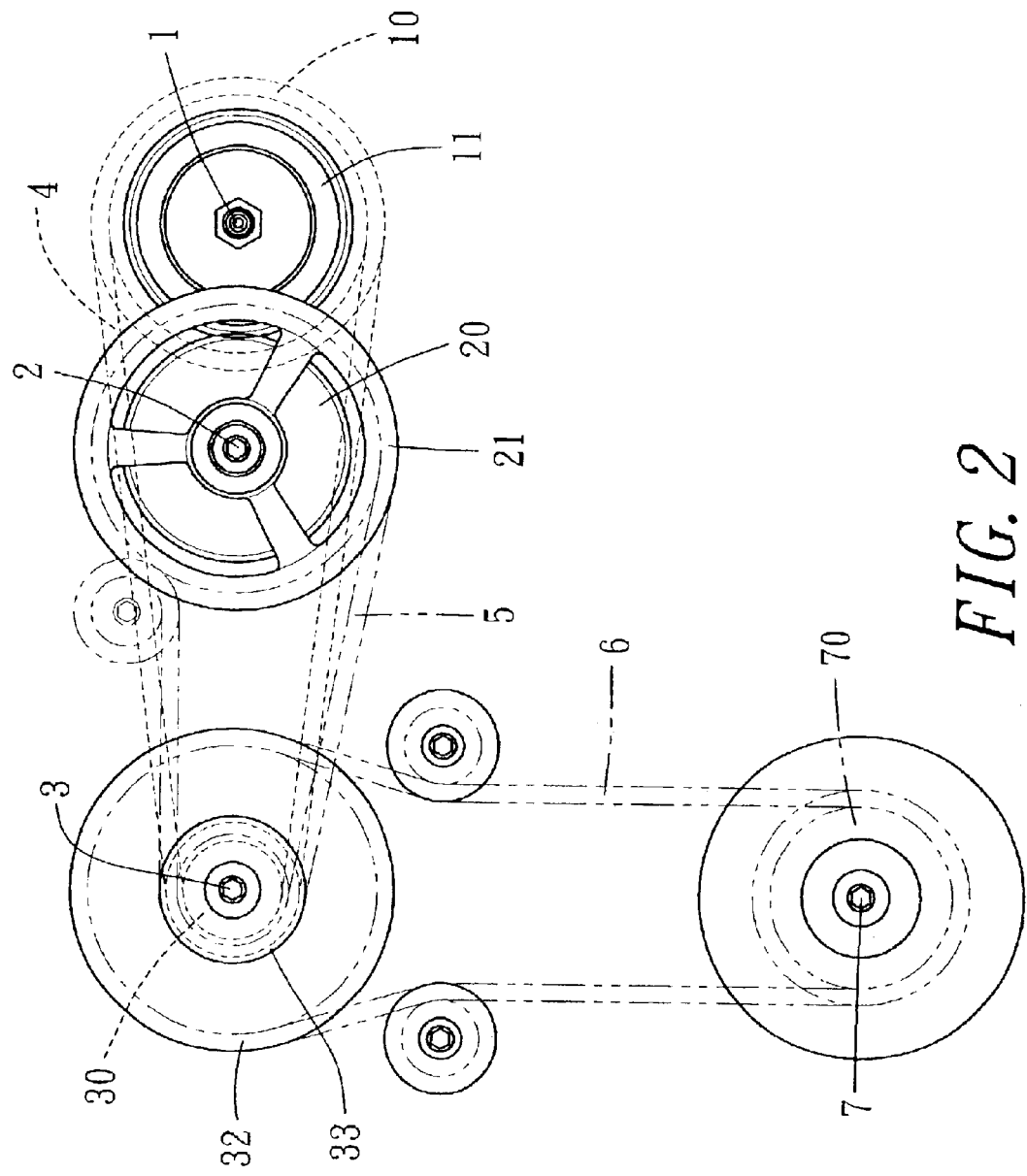
FIG. 2 is a side view of the transmitting device for exercise appliances in the present invention; and, FIG. 3 is an upper cross-sectional view of the transmitting device for exercise appliances with the first shaft rotating in the reverse (counterclockwise) direction in the present invention.

A preferred embodiment of a transmitting device for exercise appliances in the present invention, as shown in FIGS. 1 and 2, includes a first shaft 1, a second shaft 2 and a third shaft 3.

The first shaft 1 is fixed on a bike frame, having its two ends respectively connected to a drive handle, a first transmitting wheel 10 and a first transmitting gear 11 respectively fixed at opposing portion of the first shaft 1. When the first shaft 1 is rotated by the drive handles, the first transmitting wheel 10 and the first transmitting gear 11 are rotated synchronously in the same direction as the first shaft 1.

The second shaft 2 is also fixed on the bike frame spaced apart in parallel to the first shaft 1, having a second transmitting gear 20 engaging with and rotated synchronously by the first transmitting gear 11. Further, the second shaft 2 has a second transmitting wheel 21 also fixed thereon by means of a one-way bearing 22 beside the second transmitting gear 20. When the first transmitting gear 11 is rotated by the first shaft 1, as shown in the ordinary (clockwise) direction marked by the arrow head A1 in FIG. 1, the second transmitting gear 20 is rotated in the reverse (counterclockwise) direction marked by the arrow head B1 in FIG. 1. So the second shaft 2 is rotated in the reverse (counterclockwise) direction as the second transmitting gear 20, and the second transmitting wheel 21 fixed with the one-way bearing 22 may become loose from the second shaft 2, when it is not rotated by the second shaft 2 in the reverse direction.

Figure 3:
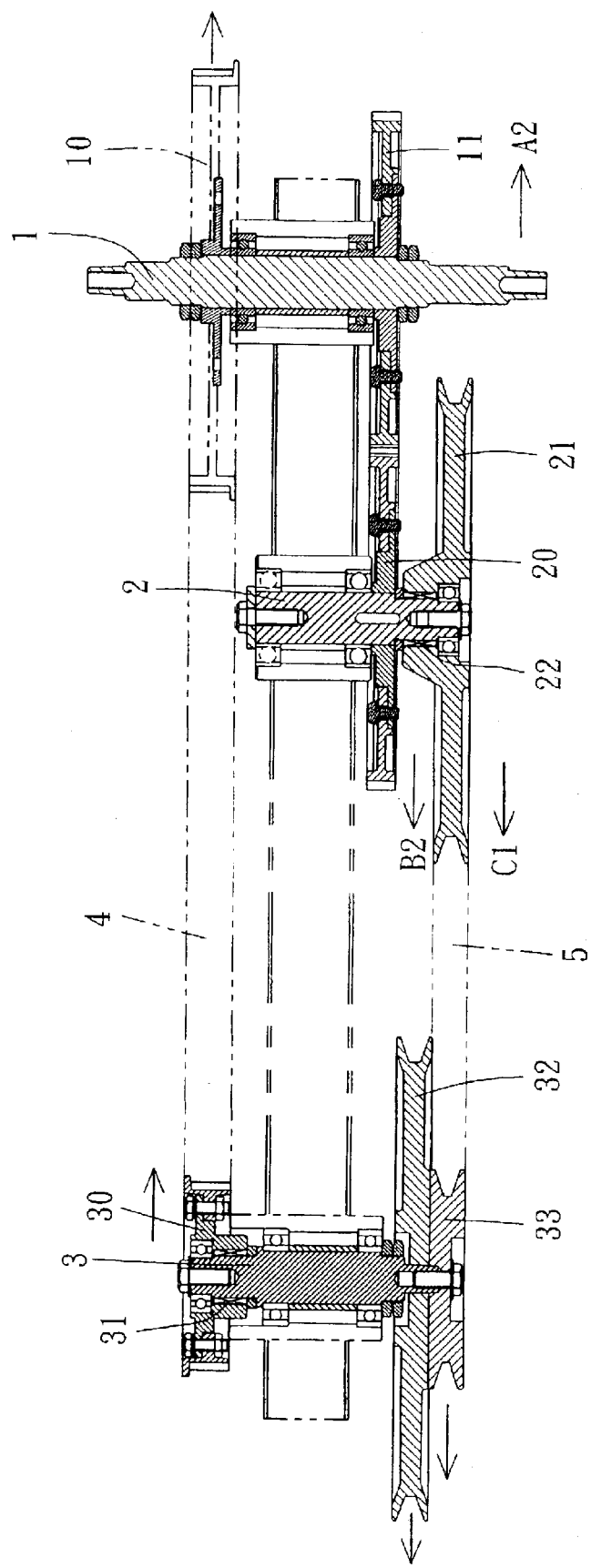

On the contrary, if the first shaft 1 rotates the first transmitting gear 11 in the reverse direction, as shown by the arrow head A2 in FIG. 3, the second transmitting gear 20 together with the second shaft 2 rotates in the ordinary direction, as shown by the arrow head B2 in FIG. 3. Then the second transmitting wheel 21 may be locked by the one-way bearing 22 and rotates together with the second shaft 2 in the ordinary direction.

The third shaft 3 is also fixed on the bike frame at a far rear location of the second shaft 2 in parallel, having a third transmitting wheel 30 fixed thereon by means of a one-way bearing 31 and connected with the first transmitting wheel 10 by a first connecting member 4 such as an endless belt. So when the third transmitting wheel 30 is rotated in the ordinary direction by the first connecting member 4, the third shaft 3 is also rotated in the ordinary direction, as the one-way bearing 31 and the third shaft 3 are locked with each other. On the contrary, if the third transmitting wheel 30 is rotated in the reverse direction, the third shaft 3 is not rotated in the reverse direction by the third transmitting wheel 30 owing to the third shaft 3 not being locked but in loose connection with the one-way bearing 31.

Further, the third shaft 3 also has a fourth and a fifth transmitting wheel 32 and 33 fixed thereon side by side at the end opposite to the third transmitting wheel 30. The fifth transmitting wheel 33 is connected with the second transmitting wheel 21 by means of a second connecting member 5 such as an endless belt. So when the second transmitting wheel 21 is rotated synchronously by the second shaft 2 in the ordinary direction, as shown in FIG. 3, the fifth transmitting wheel 33 with the third shaft 3 is also rotated in the ordinary direction at the same time. On the contrary, if the second shaft 2 is rotated in the reverse direction as shown FIG. 1, the second transmitting wheel 21 of the second shaft 2 is not rotated by the second shaft 2 owning to the loose condition of the one-way bearing 22 relative to the second shaft 2, with the fifth transmitting wheel 33 not being rotated in the reverse direction either. The fourth transmitting wheel 32 on the third shaft 3 is to be connected with an output wheel 70 as shown in FIG. 2 by means of a third connecting member 6 to rotate the output wheel 70.

Next, the operation of the transmitting device for exercise appliances is to be described. When the first shaft 1 is rotated in the ordinary direction as shown by the arrow head A1 in FIG. 1, the first transmitting wheel 10 and the first transmitting gear 11 are both rotated in the same ordinary direction. Then the first transmitting wheel 10 rotates the third transmitting wheel 30 of the third shaft 3 through the first connecting member 4, and the third transmitting wheel 30 rotates in the ordinary direction because of its connection with the third shaft 3 by the function of the one-way bearing 31. Then the fourth and the fifth transmitting wheels 32 and 33 fixed and rotated synchronously with the third shaft 3 are also rotated in the ordinary direction. Thus the fourth transmitting wheel 32 rotates in the ordinary direction and the output wheel 70 on a fourth shaft 7 is connected with the fourth transmitting wheel 32 by means of a third connecting member 6, as shown in FIG. 2. The driving order is (1) the first shaft 1 rotating in the ordinary direction, (2) the first transmitting wheel 10 rotating in the ordinary direction, (3) the third transmitting wheel 30 rotating in the ordinary direction, (4) the third shaft 3 rotating in the ordinary direction, (5) the fourth transmitting 32 wheel rotating in the ordinary direction, (6) the output wheel 70 rotating in the ordinary direction. And if the output wheel 70 is a fan, the fan will produce wind. If a resisting member of a generator is fixed at the other end of the output wheel 70, the generator will produce electricity for output.

In the rotating process for the ordinary direction of the first shaft 1, the fifth transmitting wheel 33 on the third shaft 3 and the second transmitting wheel 21 are connected by the second connecting member 5, so that the second transmitting wheel 21 also rotates in the ordinary direction as shown by the arrow head Cl in FIG. 1. On the other hand, when the first transmitting gear 11 also rotates in the ordinary direction as shown by the arrow head A1 in FIG. 1, the second transmitting gear 20 on the second shaft engaging with the first transmitting gear 11 will be rotated in the reverse direction as shown by the arrow head A1 in FIG. 1. Subsequently, the second shaft 2 is rotated in the reverse direction. However, the second transmitting wheel 21 only rotates idly, not forcing the second transmitting wheel 22 to rotate in the reverse direction, but only rotate in the ordinary direction by the fifth transmitting wheel 33.

On the contrary, when the first shaft 1 is rotated in the reverse direction as shown by the arrow head A2 in FIG. 3, the first transmitting wheel 10 and the first transmitting gear 11 are both rotated in the same reverse direction. Then the first transmitting gear 11 rotates the second transmitting gear 20 on the second shaft 2 in the ordinary direction as shown by the arrowhead B2 in FIG. 3. So the second shaft 2 may rotate in the same ordinary direction, forcing the second transmitting wheel 21 to rotate in the ordinary direction because of the one-way bearing 22 of the second transmitting wheel 21 being locked with the second shaft 2. Further, the second connecting member 5 will pull to rotate the fifth transmitting wheel 33 fixed on the third shaft 3 synchronously, with the fourth transmitting wheel 32 also rotating in the same ordinary direction so as to rotate the output wheel 70 on the fourth shaft 7 by the third connecting member 6 pulled by the fourth transmitting wheel 32 as shown in FIG. 2. The rotation driving order, as shown in FIG. 3, is (1) the first shaft 1 rotating in the reverse direction, (2) the first transmitting gear 11 rotating in the reverse direction, (3) the second transmitting gear 20 rotating in the ordinary direction, (4) the second shaft 2 rotating in the ordinary direction, (5) the second transmitting wheel 21 rotating in the ordinary direction, (6) the fifth transmitting wheel 33 rotating in the ordinary direction, (7) the third shaft 3 rotating in the ordinary direction, (8) the fourth transmitting wheel 32 rotating in the ordinary direction, and (9) the output wheel 70 rotating in the ordinary direction.

In the process of the reverse rotation of the first shaft 1, the first transmitting wheel 10 may rotate synchronously and reversedly the third transmitting wheel 30 on the third shaft 3 with the first connecting member 4 pulled by the first transmitting wheel 1. But, the output wheel 70 will never be rotated in the reverse direction, because the third transmitting wheel 30 is fixed on the third shaft 3 by means of the one-way bearing 31 to permit the third transmitting wheel 30 to rotate idly owing to the loose connection of the one-way bearing 31 with the third shaft 3.

As understood from the foresaid description, the fourth transmitting wheel 32 and the output wheel 70 are always maintained to rotate in the ordinary direction, whether the first shaft 1 is rotated in the ordinary direction or the reverse direction. But in the reverse rotation of the conventional stationary bike, it will not rotate reversely until the flywheel stops by inertia. Therefore, an exercise appliance having the transmitting device in the invention connected with a resisting member of a generator or a fan can be actuated to continuously generate electricity or to rotate without interruption (until stopped by inertia).

While the preferred embodiment of the invention has been described above, it will be recognized and understood that various modifications may be made therein and the appended claims are intended to cover all such modifications that may fall within the spirit and scope of the invention.

I claim:

1. A transmitting device for exercise appliances comprising:

a first shaft fixed on a bike frame configured to be rotated by a user input means, said first shaft having a first transmitting wheel and a first transmitting gear respectively fixed on two opposing portions thereof, said first transmitting wheel and said first transmitting gear rotated together with said first shaft simultaneously;

a second shaft also fixed on the bike frame and spaced apart in parallel with said first shaft, said second shaft having a second transmitting wheel fixed on said second shaft by a first one-way bearing to let said second transmitting wheel rotate in a forward direction when said second shaft rotates in the forward direction; said one-way bearing of said second transmitting wheel allows said second transmitting wheel to freewheel with said second shaft when said second shaft is rotated in a reverse direction;

a third shaft also fixed on the bike frame in parallel with said second shaft and said first shaft, said third shaft having a third transmitting wheel provided with a second one-way bearing connected with said third shaft, said second one-way bearing permitting said third transmitting wheel to rotate in the forward direction when said third shaft rotates in the forward direction, said second one-way bearing permitting said third transmitting wheel to freewheel with said third shaft when said third transmitting wheel is rotated in the reverse direction, said third transmitting wheel connected with said first transmitting wheel by a first connecting member; said third shaft further having a fourth and a fifth transmitting wheel fixed side by side thereon and spaced apart from said third transmitting wheel, said fifth transmitting wheel connected with said second transmitting wheel by a second connecting member;

said fourth transmitting wheel always rotates in the forward direction regardless of whether said first shaft is rotated in the forward direction or the reverse direction; and said first transmitting gear is engaged with said second transmitting gear.

2. The transmitting device for exercise appliances as claimed in claim 1, wherein said fourth transmitting wheel on said third shaft is connected with a fan.

3. The transmitting device for exercise appliances as claimed in claim 1, wherein said first, and second and said third connecting members are endless belts.

* * * * *